(12) United States Patent
Dougakiuchi

(10) Patent No.: US 12,542,414 B2
(45) Date of Patent: Feb. 3, 2026

(54) OPTICAL KIT AND OPTICAL DEVICE

(71) Applicant: HAMAMATSU PHOTONICS K.K., Hamamatsu (JP)

(72) Inventor: Tatsuo Dougakiuchi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 463 days.

(21) Appl. No.: 18/025,972

(22) PCT Filed: Jun. 17, 2021

(86) PCT No.: PCT/JP2021/023098
§ 371 (c)(1),
(2) Date: Mar. 13, 2023

(87) PCT Pub. No.: WO2022/064791
PCT Pub. Date: Mar. 31, 2022

(65) Prior Publication Data
US 2023/0369822 A1  Nov. 16, 2023

(30) Foreign Application Priority Data

Sep. 23, 2020 (JP) ................. 2020-158634

(51) Int. Cl.
*H01S 3/04*  (2006.01)
*H01S 3/086*  (2006.01)
(Continued)

(52) U.S. Cl.
CPC .......... *H01S 5/02326* (2021.01); *H01S 3/086* (2013.01); *H01S 3/1055* (2013.01);
(Continued)

(58) Field of Classification Search
CPC .... H01S 5/02326; H01S 3/086; H01S 3/1055; H01S 5/02253; H01S 5/02255;
(Continued)

(56) References Cited

FOREIGN PATENT DOCUMENTS

| CN | 1763587 A | 4/2006 |
|---|---|---|
| CN | 113615017 A | 11/2021 |

(Continued)

OTHER PUBLICATIONS

Wysocki, G. et al., "Widely tunable mode-hop free external cavity quantumc ascade lasers for high resolution spectroscopy and chemical sensing," Applied Physics B, Sep. 2008, vol. 92, pp. 305-311.
(Continued)

*Primary Examiner* — Kinam Park
(74) *Attorney, Agent, or Firm* — Faegre Drinker Biddle & Reath LLP

(57) ABSTRACT

Disclosed is an optical kit for forming an optical system including an external resonator of a laser light source that outputs laser light, the optical kit including: a base including a main surface; a light source holding part provided on the main surface for holding the laser light source; and a holding part provided on the main surface for holding the optical system, wherein the holding part has a reflector holding part for holding the corner reflector, a first opening member holding part for holding the first opening member, and a second opening member holding part for holding the second opening member, and wherein the first opening member holding part is positioned closer to the reflector holding part than an emission surface of the laser light of the laser light source held by the light source holding part.

9 Claims, 12 Drawing Sheets

(51) Int. Cl.
| | |
|---|---|
| *H01S 3/1055* | (2006.01) |
| *H01S 5/02253* | (2021.01) |
| *H01S 5/02255* | (2021.01) |
| *H01S 5/023* | (2021.01) |
| *H01S 5/02326* | (2021.01) |
| *H01S 5/024* | (2006.01) |
| *H01S 5/14* | (2006.01) |
| *H01S 3/101* | (2006.01) |
| *H01S 5/0225* | (2021.01) |
| *H01S 5/34* | (2006.01) |

(52) U.S. Cl.
CPC ...... *H01S 5/02253* (2021.01); *H01S 5/02255* (2021.01); *H01S 5/023* (2021.01); *H01S 5/02415* (2013.01); *H01S 5/141* (2013.01); *H01S 3/101* (2013.01); *H01S 5/0225* (2021.01); *H01S 5/3402* (2013.01)

(58) Field of Classification Search
CPC ...... H01S 5/023; H01S 5/02415; H01S 5/141; H01S 3/101; H01S 5/0225; H01S 5/3402
See application file for complete search history.

(56) References Cited

FOREIGN PATENT DOCUMENTS

| | | |
|---|---|---|
| JP | H11-068248 A | 3/1999 |
| JP | 2006-107611 A | 4/2006 |
| JP | 2007-150028 A | 6/2007 |
| JP | 2012-178436 A | 9/2012 |
| JP | 2015-065474 A | 4/2015 |

OTHER PUBLICATIONS

International Preliminary Report on Patentability mailed Apr. 6, 2023 for PCT/JP2021/023098.

OPTICAL KIT AND OPTICAL DEVICE

TECHNICAL FIELD

The present disclosure relates to an optical kit and an optical device.

BACKGROUND ART

Non-Patent Literature 1 describes an external cavity quantum cascade laser system. This laser system includes a quantum cascade laser, a collimating lens that collimates a laser beam from a quantum cascade, a diffraction grating that reflects 0th-order diffraction light of the laser beam from the collimating lens in a predetermined direction, and a mirror that further reflects the 0th-order diffraction light from the diffraction grating. The diffraction grating and the mirror are installed on a common rotatable platform. An extension line of a reflecting surface of the diffraction grating and an extension line of a reflecting surface of the mirror exactly intersect with each other at a rotation axis of the platform.

CITATION LIST

Non-Patent Literature

[Non-Patent Literature 1] R. Wysocki, R. Lewicki, R. F. Curl, F. K. Tittel, L. Diehl, F. Capasso, M. Troccoli, G. Hofler, D. Bour, S. Corzine, R. Maulini, M. Giovannini, J. Faist "Widely tunable mode-hop free external cavity quantumcascade lasers for high resolution spectroscopy and chemical sensing" Applied Physics B, September 2008, Volume 92, Issue 3, pp 305-311

SUMMARY OF INVENTION

Technical Problem

By employing a configuration of the laser system as described above, a position and a direction of the output laser beam can be fixed during a wavelength tuning process. In an operation of such a laser system, if the position and the direction of the output light deviate in a case where a user replaces a laser light source to change a wavelength band and the like, it is necessary to adjust a subsequent optical system according to this. Therefore, the laser system may be required to restore the position and the direction of the emitted light even after the replacement of the laser light source. However, it is not easy to perform optical axis adjustment of the emitted light at the same time as performing fine adjustment for establishing an external resonator. Furthermore, in a case where the diffraction grating needs to be replaced at the same time to correspond to the replaced laser light source, exact alignment is also required for fixing the position and the direction of the output light during the wavelength tuning process, and thus the adjustment is still difficult. In a case where invisible light such as mid-infrared light is dealt with as in Non-Patent Literature 1, the adjustment becomes particularly difficult.

An object of the present disclosure is to provide an optical kit and an optical device that enable easy adjustment of a position and a direction of output light.

Solution to Problem

According to the present disclosure, there is provided an optical kit for forming an optical system including an external resonator of a laser light source that outputs laser light, the optical kit including: a base including a main surface; a light source holding part provided on the main surface and configured to hold the laser light source; and a holding part provided on the main surface and configured to hold the optical system, wherein the optical system includes a corner reflector constituted by a reflective diffraction grating configured to diffract laser light emitted from the laser light source and is incident from a first direction and configured to reflect 0th-order diffraction light in a second direction intersecting with the first direction and a mirror configured to reflect the diffraction light from the reflective diffraction grating in a third direction different from the first direction and the second direction, and a first opening member and a second opening member arranged in the third direction to form an optical opening through which the diffraction light from the corner reflector passes in order, wherein the holding part has a reflector holding part configured to hold the corner reflector, a first opening member holding part configured to hold the first opening member, and a second opening member holding part configured to hold the second opening member, wherein the reflector holding part includes a first mechanism that enables adjustment of an optical axis of the diffraction light in each of the reflective diffraction grating and the mirror, wherein, in the third direction, the first opening member holding part is positioned closer to the reflector holding part than an emission surface of the laser light of the laser light source held by the light source holding part, and wherein, in the third direction, the second opening member holding part is positioned closer to a side opposite to the reflector holding part than the emission surface of the laser light of the laser light source held by the light source holding part.

The position and the direction of the output light can be adjusted using this optical kit as follows. That is, first, the corner reflector is held by the reflector holding part. Then, while the light intensity of the diffraction light that has passed through the optical opening of the first opening member via the corner reflector is monitored, the optical axis of the diffraction light from the reflective diffraction grating is adjusted by the second mechanism such that the maximum value of the light intensity is obtained. When the maximum value of the light intensity of the diffraction light that has passed through the optical opening of the first opening member is obtained, the optical opening of the first opening member is sufficiently enlarged, or the first opening member is temporarily removed, and then, while the light intensity of the diffraction light that has passed through the optical opening of the second opening member via the corner reflector is monitored, the optical axis of the diffraction light from the mirror is adjusted by the first mechanism such that the maximum value of the light intensity is obtained. The center of the optical opening of the first opening member and the center of the optical opening of the second opening member can be aligned with one straight line within a range of machining accuracy of the base and the holding parts. Therefore, by alternately repeating the optical axis adjustment of the diffraction light performed while monitoring the intensity of the diffraction light that has passed through the optical opening of the first opening member and the optical axis adjustment of the diffraction light performed while monitoring the intensity of the diffraction light that has passed through the optical opening of the second opening member, the optical axis of the diffraction light passing through the optical openings of the first opening member and the second opening member can be aligned with the one straight line.

As a result of these adjustments, the optical axis of the diffraction light which is output from the laser light source and passes through the optical openings of the first opening member and the second opening member via the corner reflector can be aligned with the one straight line. Accordingly, the position and the direction of the output light are fixed. In this way, according to this optical kit, the position and the direction of the output light can be easily adjusted. Particularly, in the optical kit, the first opening member holding part is positioned closer to the reflector holding part than the emission surface of the laser light of the laser light source held by the light source holding part, and the second opening member holding part is positioned closer to a side opposite to the reflector holding part than the emission surface of the laser light of the laser light source held by the light source holding part. That is, in this optical kit, the distance between the first opening member and the second opening member is ensured. Therefore, the inclination of the optical axis (the one straight line) of the diffraction light passing through both the optical opening of the first opening member and the optical opening of the second opening member is curbed, and the position and the direction of the output light can be adjusted with higher accuracy.

In the optical kit according to the present disclosure, the optical system may include a lens which is disposed between the laser light source and the corner reflector and to which the laser light is input in the first direction, and a third opening member disposed to form an optical opening through which the laser light that has passed through the lens passes in a case where the corner reflector is not present, the laser light that has passed through the lens may be incident on the reflective diffraction grating, the holding part may have a lens holding part configured to hold the lens, and a third opening member holding part configured to hold the third opening member, and the reflector holding part may include a second mechanism configured to hold the entire corner reflector to be rotatable along the main surface.

In this case, the position and the direction of the output light can be adjusted as follows. That is, first, each holding part except for the reflector holding part of the holding parts is caused to hold each optical component except for the corner reflector of the optical system. Further, the laser light source is installed such that the laser light output from the laser light source passes through the optical opening of the third opening member held by the third opening member holding part via the lens held by the lens holding part. Next, while the light intensity of the laser light that has passed through the optical opening of the third opening member is monitored, the position of the laser light source with respect to the lens is adjusted such that the maximum value of the light intensity is obtained. As a result, the positional alignment between the light emitting point of the laser light source and the center of the lens is achieved. The center of the lens and the center of the optical opening of the third opening member can be aligned with another straight line within a range of machining accuracy of the base and the holding part. Therefore, through the above-described step, the optical axis of the laser light which is output from the laser light source and passes through the lens is aligned with the other straight line.

Thereafter, adjustments using the second opening member and the third opening member can be performed in the same manner as described above. That is, the corner reflector is held by the reflector holding part. Then, while the light intensity of the diffraction light that has passed through the optical opening of the first opening member via the corner reflector is monitored, the optical axis of the diffraction light from the reflective diffraction grating is adjusted by the second mechanism such that the maximum value of the light intensity is obtained. When the maximum value of the light intensity of the diffraction light that has passed through the optical opening of the first opening member is obtained, the optical opening of the first opening member is sufficiently enlarged, or the first opening member is temporarily removed, and then, while the light intensity of the diffraction light that has passed through the optical opening of the second opening member via the corner reflector is monitored, the optical axis of the diffraction light from the mirror is adjusted by the first mechanism such that the maximum value of the light intensity is obtained. The center of the optical opening of the first opening member and the center of the optical opening of the second opening member can be aligned with one straight line parallel to the other straight line described above within a range of machining accuracy of the base and the holding parts. Therefore, by alternately repeating the optical axis adjustment of the diffraction light performed while monitoring the intensity of the diffraction light that has passed through the optical opening of the first opening member and the optical axis adjustment of the diffraction light performed while monitoring the intensity of the diffraction light that has passed through the optical opening of the second opening member, the optical axis of the diffraction light passing through the optical openings of the first opening member and the second opening member can be aligned with the one straight line.

As a result of these two adjustments, the optical axis of the laser light which is output from the laser light source and passes through the lens and the optical axis of the diffraction light passing through the optical openings of the first opening member and second opening member via the corner reflector can be each aligned with the straight lines. In this way, according to this optical kit, the position and the direction of the output light can be easily adjusted. When the two straight lines with which the optical axes are aligned are parallel to each other (that is, when the third direction is a direction opposite to the first direction), it is ensured that the reflecting surface of the reflective diffraction grating and the reflecting surface of the mirror are orthogonal to each other by the above adjustments, and the position and the direction of the output light when the wavelength of the output light (the diffraction light) is selected by the rotation of the corner reflector using the first mechanism are fixed. Therefore, a configuration in which the position and the direction of the output light when the wavelength of the output light is selected are fixed can be easily realized.

In the optical kit according to the present disclosure, the first opening member holding part and the lens holding part may be arranged in the second direction. Thus, the space between the emission surface of the laser light source and the corner reflector can be utilized.

In the optical kit according to the present disclosure, the laser light source may include a laser element configured to oscillate the laser light, and a cooling part provided in the laser element on a side opposite to the emission surface of the laser light and configured to cool the laser element, and the second opening member holding part may be positioned closer to a side opposite to the reflector holding part than the cooling part in the third direction. In this case, it is possible to more reliably secure the distance between the first opening member and the second opening member and curb the influence of exhaust heat from the cooling part on the optical axis adjustment using the second opening member.

In the optical kit according to the present disclosure, the first mechanism may enable adjustment of an optical axis of the diffraction light by holding the reflective diffraction grating and the mirror to be independently rotatable of each other about rotation axes along the main surface. In this way, it is possible to enable the adjustment of the optical axis of the diffraction light by holding the reflective diffraction grating and the mirror to be independently rotatable of each other about the rotation axes along the main surface.

In the optical kit according to the present disclosure, the reflector holding part may further include a third mechanism configured to hold the reflective diffraction grating such that the reflective diffraction grating does not rotate along the main surface and configured to hold the mirror such that the mirror independently rotates along the main surface. In this case, it is possible to adjust the optical axis of the diffraction light from the mirror while an unintended change of the wavelength of the diffracted light is curbed.

In the optical kit according to the present disclosure, the reflector holding part may further include a fourth mechanism configured to hold the corner reflector to be movable in the second direction. In this case, the degree of freedom in adjusting the optical axis of the diffraction light emitted from the corner reflector is improved.

The optical kit according to the present disclosure may further include a light source holding part configured to hold the laser light source. In this case, when the laser light source is replaced, positioning of the laser light source becomes easy, and alignment between the light emitting point of the laser light source and the center of the lens becomes easy.

According to the present disclosure, there is provided an optical device including: the optical kit described above; the lens held by the lens holding part; the corner reflector held by the reflector holding part; the first opening member held by the first opening member holding part; the second opening member held by the second opening member holding part; and the third opening member held by the third opening member holding part. According to this optical device, the position and the direction of the output light can be adjusted easily and with high accuracy for the reasons described above.

According to the present disclosure, there is provided another optical device in which an optical system including an external resonator of a laser light source configured to output laser light is formed, the optical device including: a light source holding part provided on a predetermined surface of the optical device and configured to hold the laser light source; and a holding part provided on the predetermined surface and configured to hold the optical system, wherein the optical system includes a corner reflector constituted by a reflective diffraction grating configured to diffract laser light emitted from the laser light source and is incident in a first direction and configured to reflect 0th-order diffraction light in a second direction intersecting with the first direction and a mirror configured to reflect the diffraction light from the reflective diffraction grating in a third direction different from the first direction and the second direction, and a first opening member and a second opening member arranged in the third direction to form an optical opening through which the diffraction light from the corner reflector passes in order, wherein the holding part has a reflector holding part configured to hold the corner reflector, a first opening member holding part configured to hold the first opening member, and a second opening member holding part configured to hold the second opening member, wherein the reflector holding part includes a first mechanism that enables adjustment of an optical axis of the diffraction light in each of the reflective diffraction grating and the mirror, wherein the first opening member holding part is positioned closer to the reflector holding part than an emission surface of the laser light of the laser light source held by the light source holding part in the third direction, and wherein the second opening member holding part is positioned closer to a side opposite to the reflector holding part than the emission surface of the laser light of the laser light source held by the light source holding part in the third direction. According to this optical device, the position and the direction of the output light can be adjusted easily and with high accuracy for the reasons described above.

Advantageous Effects of Invention

According to the present disclosure, it is possible to provide an optical kit and an optical device that enable easy adjustment of a position and a direction of output light.

DESCRIPTION OF EMBODIMENTS

Figure 1:
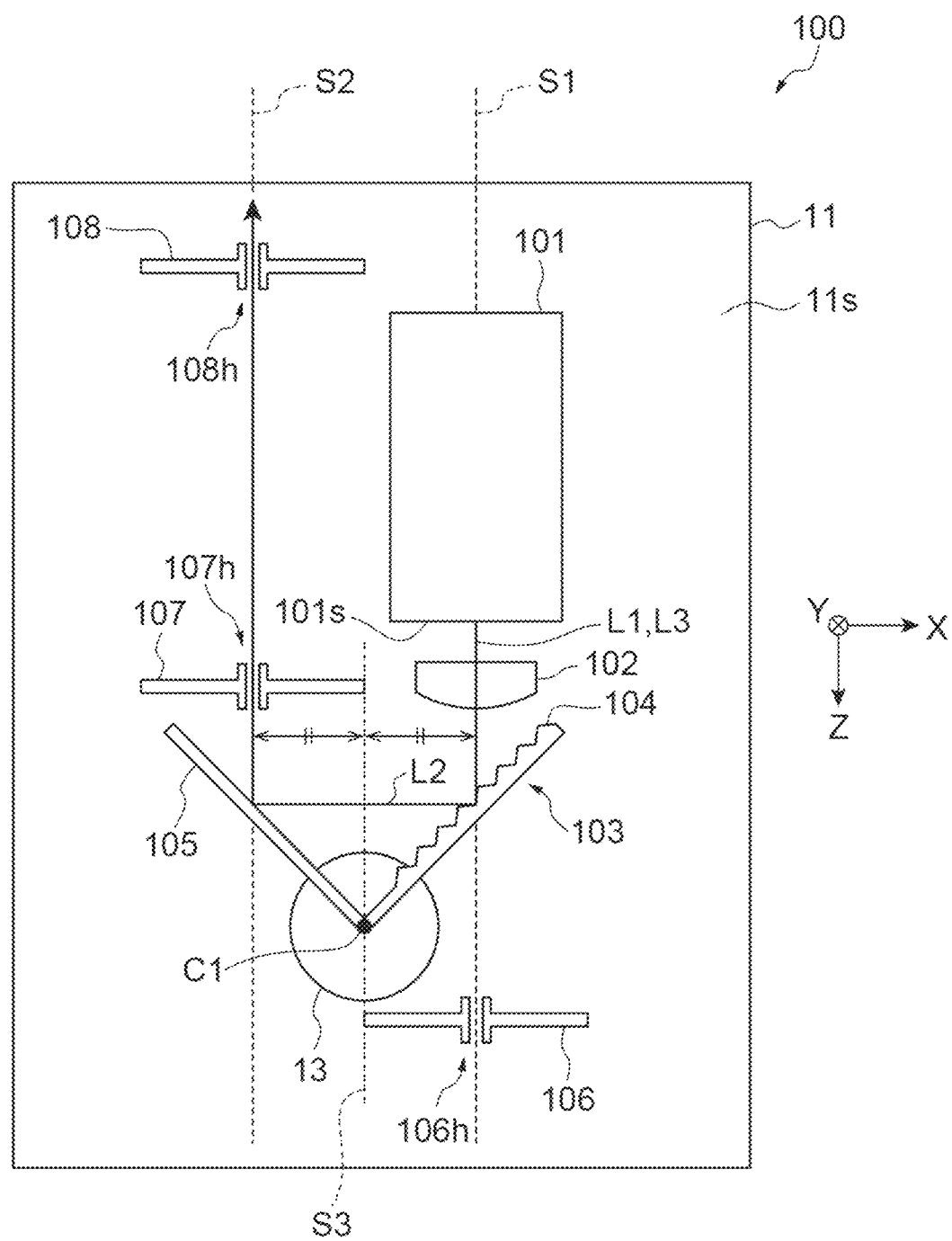
FIG. 1 is a schematic plan view showing a laser device according to the present embodiment.

Hereinafter, an embodiment will be described in detail with reference to the drawings. In the drawings, the same or corresponding elements may be denoted by the same reference signs and redundant description may be omitted. Further, in the drawings, an orthogonal coordinate system defined by an X axis, a Y axis, and a Z axis may be shown.

Figure 2:
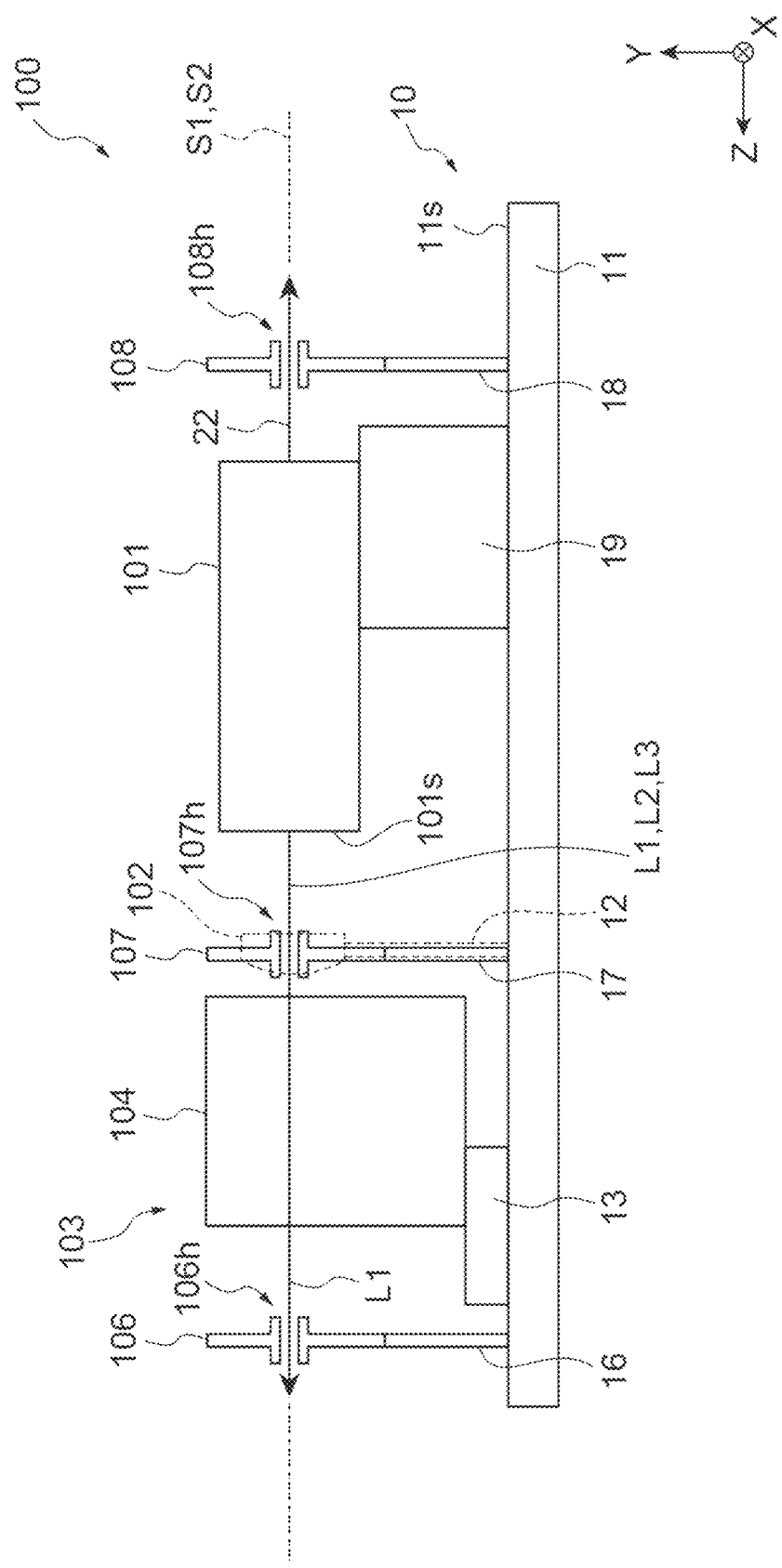
FIG. 2 is a schematic side view of the laser device shown in FIG. 1.

FIG. 1 is a schematic plan view showing a laser device according to the present embodiment. FIG. 2 is a schematic side view of the laser device shown in FIG. 1. As shown in FIGS. 1 and 2, the laser device (an optical device) 100 includes a laser light source 101, a lens 102, a corner reflector 103, an iris (a third opening member) 106, an iris (a first opening member) 107, and an iris (a second opening member) 108. The corner reflector 103 includes a reflective diffraction grating 104 and a mirror 105. In FIG. 2, in order to facilitate explanation of a positional relationship between the iris 107 and a holding part 17, which will be described later, and the iris 108 and a holding part 18, which will be described later, each of the lens 102 and a holding part 12 overlapping the iris 107 and the holding part 17 is indicated by a dashed line.

In the laser device 100, a straight line S1, a straight line S2, and a straight line S3 are defined. Each of the straight lines S1, S2, and S3 is a virtual line. The straight line S1, the straight line S2, and the straight line S3 are parallel to each other when viewed in an X-axis direction (a negative direction is a second direction) and a Y-axis direction. The straight lines S1 to S3 are along a Z-axis direction (a positive direction is a first direction, and a negative direction is a third direction). The straight line S1 and the straight line S2 are equidistant from the straight line S3. In other words, the straight line S3 passes through the middle between the straight line S1 and the straight line S2.

The laser light source 101 is, but not particularly limited to, a quantum cascade laser as an example. The laser light source 101 outputs laser light L1. A wavelength of the laser light L1 is, for example, 3 μm to 15 μm. The lens 102 receives the laser light L1 output from the laser light source 101 in the Z-axis positive direction (the first direction) and collimates the laser light L1. The lens 102 is an aspherical lens made of, for example, ZnSe or Ge in a case where the laser light source 101 is the quantum cascade laser. As an example, a surface of the lens 102 on a side of the laser light source 101 and a surface of the lens 102 on a side opposite to the laser light source 101 are coated with a low-reflection coating. A light emitting point of the laser light source 101 and a center point of the lens 102 substantially are aligned with each other and are positioned on the straight line S1.

The laser light L1 emitted from the lens 102 is incident on the corner reflector 103. The laser light L1 which has been incident on the corner reflector 103 is incident on the reflective diffraction grating 104. That is, the reflective diffraction grating receives the laser light L1 emitted from the laser light source 101 from the Z-axis positive direction (the first direction). An incidence position of the laser light L1 on the reflective diffraction grating 104 is an intersection point between a reflecting surface 104s (see FIG. 4) of the reflective diffraction grating 104 and the straight line S1. Further, as an example, an angle of incidence of the laser light L1 on the reflecting surface 104s (an angle between the straight line S1 and a line perpendicular to the reflecting surface 104s) is 30°. The number of grooves per unit length of the reflective diffraction grating 104, the shape of the grooves, and the like can be appropriately set according to an oscillation wavelength of the laser light source 101. However, in a case where the laser light source 101 is the quantum cascade laser, the number of grooves per 1 mm can be 150, and a blaze wavelength can be 6 μm, for example.

0th-order diffraction light L2 of the laser light L1 which has been incident on the reflective diffraction grating 104 (a component whose emission angle from the reflecting surface 104s is the same as that of normal plane reflection and is not affected by wavelength dispersion due to the diffraction grating), that is, diffraction light L2 of the laser light L that has passed through the lens 102, is reflected in the X-axis negative direction (the second direction). In other words, the reflective diffraction grating 104 diffracts the laser light L1 which has been incident thereon in the Z-axis positive direction and reflects the 0th-order diffraction light L2 in the X-axis negative direction. 1st-order diffraction light L3 of laser light L1 which has been incident on reflective diffraction grating 104 is diffracted in the Z-axis negative direction (the third direction), is incident on the lens 102, is converged by the lens 102, and is coupled on an emission end surface of the laser light L1 from the laser light source 101. As a result, an external resonator is formed between the laser light source 101 and the reflective diffraction grating 104. In other words, the reflective diffraction grating 104 diffracts the laser light L1 which has been incident thereon in the Z-axis positive direction and directs the 1st-order diffraction light L3 in the Z-axis negative direction.

The diffraction light L2 reflected in the X-axis negative direction by the reflective diffraction grating 104 is incident on the mirror 105. An incidence position of the diffraction light L2 on the mirror 105 is an intersection point between a reflecting surface 105s (see FIG. 4) of the mirror 105 and the straight line S2. The reflecting surface 104s of the reflective diffraction grating 104 and the reflecting surface 105s of the mirror 105 are orthogonal to each other. The mirror 105 only has to have a reflectance of 90% or more with respect to the light output from the laser light source 101. As an example, a flat gold mirror with gold vapor-deposited on its surface may be used as the mirror 105. The diffraction light L2 which has been incident on the mirror 105, that is, the diffraction light L2 from the reflective diffraction grating 104, is reflected in the Z-axis negative direction (the third direction).

The diffraction light L2 reflected by the mirror 105, that is, the diffraction light L2 from the corner reflector 103, passes through an optical opening 107h of the iris 107 and an optical opening 108h of the iris 108 in order. That is, the irises 107 and 108 are arranged in the Z-axis negative direction to form the optical openings 107h and 108h through which the diffraction light L2 from the corner reflector 103 passes in order. The optical opening 107h of the iris 107 and the optical opening 108h of the iris 108 face each other in the Z-axis direction (in the first direction and the third direction). The irises 106 to 108 are optical members whose hole diameters (optical opening sizes) can be adjusted by diaphragms and may be the same or different. However, the minimum diaphragm diameter of each of the irises 106 to 108 may be at least 1 mm or less for the purpose of limiting a spatial optical axis position of invisible laser light within a certain range.

The iris 107 and the iris 108 are disposed such that a center of the optical opening 107h and a center of the optical opening 108h are aligned with each other on the straight line S2. The diffraction light L2 emitted from the iris 108 is output to the outside. The iris 106 is disposed such that the laser light L1 which has passed through the lens 102 passes through an optical opening 106h in a case where the corner reflector 103 is not present. The lens 102 and the optical opening 106h of the iris 106 face each other in the Z-axis direction (in the first direction and the third direction). The iris 106 is disposed such that a center of its optical opening 106h is aligned with the light emitting point of the laser light source 101 and a center of the lens 102 on the straight line S1.

In the laser device 100, with the above configuration, when the corner reflector 103 is rotated to change the wavelength of the output light (the diffraction light L2), a position and a direction of the output light remain unchanged.

The above-described laser device 100, that is, another optical system including the laser light source 101 and the external resonator of the laser light source 101, is formed by an optical kit 10. Subsequently, the optical kit for forming the laser device 100 will be described. The optical kit 10 includes a base 11 including a main surface 11s and a holding part that holds each of the above-described optical components. The base 11 is flat and integrally formed. The base 11 may have a protruding and recessed structure. In this case, the main surface 11s may be formed of top surfaces of a plurality of protrusions, that is, a plurality of surfaces facing one side, of the protruding and recessed structure. In this case, the plurality of surfaces forming the main surface 11s may be parallel to each other. The holding part has a holding part 12 for holding the lens 102 (a lens holding part), a holding part 13 for holding the corner reflector 103 (a reflector holding part), a holding part 16 for holding the iris 106 (a third opening member holding part), a holding part 17 for holding the iris 107 (a first opening member holding part), a holding part 18 for holding the iris 108 (a second opening member holding part), and a holding part 19 for holding the laser light source 101 (a light source holding part).

The straight lines S1 to S3 are positioned in a plane parallel to the main surface 11s of the base 11. In other words, the holding part 12, the holding parts 16 to 18, and the holding part 19 hold the lens 102, the irises 106 to 108, and the laser light source 101 such that the heights of the center of the lens 102, the centers of the optical openings 106h to 108h, and the light emitting point of the laser light source 101 from the main surface 11s are aligned with each other. The holding part 12 and the holding part 16 are disposed in the Z-axis direction (in the first direction and the third direction). The holding part 17 and the holding part 18 are disposed in the Z-axis direction (in the first direction and the third direction). The holding parts 16 to 18 may be the same. Further, the heights of the holding parts 16 to 18 from the main surface 11s may be the same. In these cases, since the holding parts 16 to 18 are the same (have the same height), if irises (opening members) having the same shape are used, it is possible to easily align the heights of the centers of the optical openings with each other within a range of machining accuracy.

Here, the holding part 17 (and the iris 107) is positioned closer to the holding part 13 than an emission surface 101s of the laser light L1 of the laser light source 101 held by the holding part 19 in the Z-axis negative direction. Further, the holding part 18 (and the iris 108) is positioned closer to a side opposite to the holding part 13 than the emission surface 101s of the laser light L1 of the laser light source 101 held by the holding part 19 in the Z-axis negative direction. That is, when viewed in the X-axis direction, the holding part 17 (and the iris 107), the emission surface 101s, and the holding part 18 (the iris 108) are arranged in this order in the Z-axis negative direction.

Further, the holding part 12 (and the lens 102) is disposed between the emission surface 101s and the holding part 13 (the corner reflector 103). The holding part 12 (and the lens 102) and the holding part 17 (and the iris 107) are arranged in the X-axis direction. That is, when viewed in the X-axis direction, the holding part 12 (the lens 102) and the holding part 17 (and the iris 107) are disposed to overlap each other.

Figure 3:
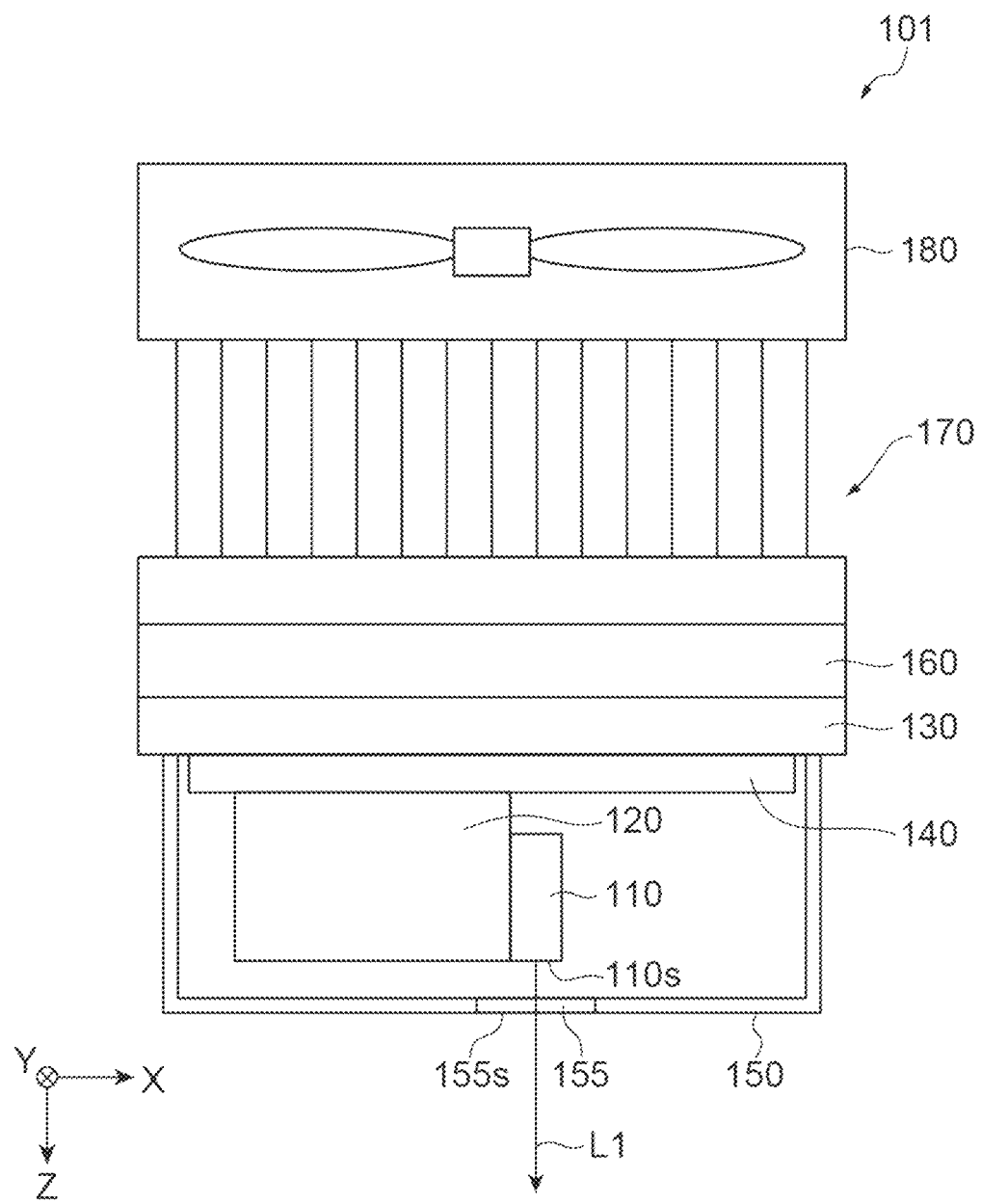
FIG. 3 is a schematic view showing an example of a configuration of a laser light source shown in FIGS. 1 and 2.

FIG. 3 is a schematic view showing an example of a configuration of the laser light source shown in FIGS. 1 and 2. As shown in FIG. 3, the laser light source 101 includes a laser element 110 that oscillates the laser light, a mounting substrate 120 on which the laser element 110 is mounted, a bottom wall portion 130 on which the mounting substrate 120 is installed, a lid member 150 that is provided on the bottom wall portion 130 and constitutes a package P that seals the laser element 110 and the mounting substrate 120 together with the bottom wall portion 130, and a cooling element 140 that is interposed between the bottom wall portion 130 and the mounting substrate 120 within the package P. The laser element 110 is, for example, a quantum cascade laser. The cooling element 140 is for cooling the laser element 110 and is, for example, a Peltier element. One end surface 110s of the laser element 110 is the emission surface 101s of the laser light L1. However, a window 155 through which the laser light L1 is transmitted in the lid member 150 is formed in the package P. Therefore, a surface 155s of the window 155 facing the outside of the package P can be the emission surface 101s of the laser light L1.

Furthermore, in the laser light source 101, the entire laser light source 101 is held by holding the bottom wall portion 130. For example, an L-shaped bracket 160 (for example, a part of the holding part 19) is provided. Furthermore, the laser light source 101 further includes a heat sink 170 provided on the bracket 160 on a side opposite to the bottom wall portion 130 and a fan 180 attached to the heat sink 170. The heat sink 170 is, for example, an air cooling type. The heat sink 170 and the fan 180 are provided on the laser element 110 on a side opposite to the emission surface 101s of the laser light L1 and function as a cooling part for cooling the laser element 110. As shown in FIGS. 1 and 2, the holding part 18 (the iris 108) is positioned at a position closer to a side opposite to the holding part 13 (the corner reflector 103) than the cooling part in the Z-axis negative direction (outside the cooling part).

Figure 4:
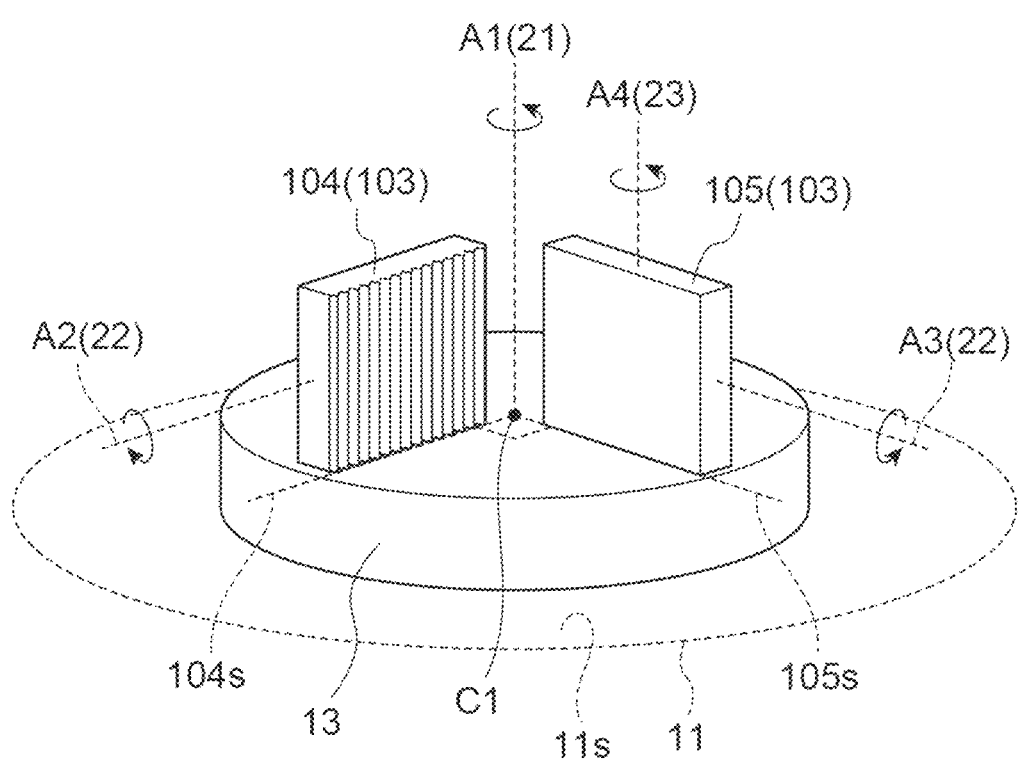
FIG. 4 is a perspective view showing one holding part shown in FIG. 2.

FIG. 4 is a perspective view showing the holding part (that holds the corner reflector) shown in FIG. 2. As shown in FIG. 4, the holding part 13 rotatably holds the entire corner reflector 103 and holds the reflective diffraction grating 104 and the mirror 105 to be independently rotatable of each other. More specifically, the holding part 13 has a mechanism (a second mechanism) 21 that holds the entire corner reflector 103 to be rotatable about a rotation axis A1 that intersects with (is orthogonal to) the main surface 11s of the base 11 (that is, along the main surface 11s). The rotation axis A1 passes through an intersection point C1 at which an angle formed between the reflecting surface 104s (an extension line thereof) of the reflective diffraction grating 104 and the reflecting surface 105s (an extension line thereof) of the mirror 105 is a right angle.

Further, the holding part 13 has a mechanism (a first mechanism) 22 that holds the reflective diffraction grating 104 to be independently rotatable about a rotation axis A2 along the main surface 11s and the reflecting surface 104s and holds the mirror 105 to be independently rotatable about a rotation axis A3 along the main surface 11s and the reflecting surface 105s. As a result, the mechanism 22 can adjust an optical axis of the diffraction light L2 in each of the reflective diffraction grating 104 and the mirror 105. Further, the holding part 13 has a mechanism (a third mechanism) 23 that holds the reflective diffraction grating 104 such that the reflective diffraction grating 104 does not independently rotate along the main surface 11s and holds the mirror 105 such that the mirror 105 independently rotates about a rotation axis A4 which intersects with (orthogonal to) the main surface 11s and is along the reflecting surface 105s (that is, along the main surface 11s).

The grooves of the reflective diffraction grating 104 extend in a direction intersecting with (orthogonal to) the main surface 11s and arranged along the main surface 11s. That is, the mechanism 21 holds the reflective diffraction grating 104 rotatably in a wavelength selection direction, and the mechanism 23 holds the reflective diffraction grating 104 not to independently rotate in the wavelength selection direction. The holding part 13 may further include a mechanism (a fourth mechanism, not shown) that holds the corner reflector 103 to be parallel-movable in the X-axis direction (the second direction) by being installed on an optical stage, rail, or the like, for example.

Figure 5:
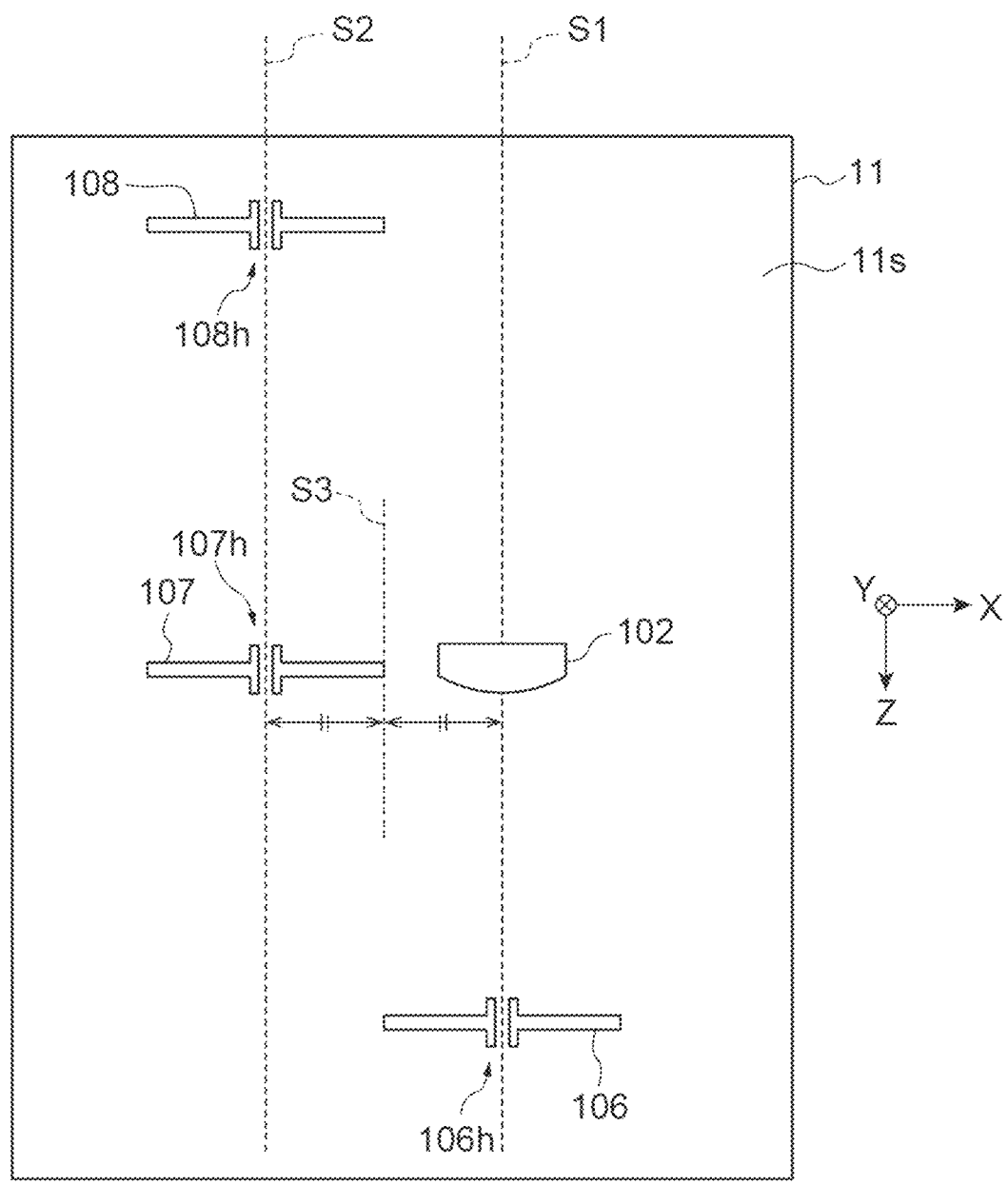
FIG. 5 is a schematic plan view showing each step of an optical axis adjustment method.

Subsequently, an optical axis adjustment method for the laser device 100 using the above optical kit 10 will be described. FIGS. 5 to 8 are a schematic plan views each showing each step of the optical axis adjustment method. FIG. 5 shows an initial state of the method. In the method, first, as shown in FIG. 5, each holding part except for the holding part 13 for the corner reflector 103 of the holding parts is caused to hold one of the optical components except for the corner reflector 103 of the optical system. At this time, each holding part holds one of the optical components such that the center of the lens 102 and the center of the optical opening 106h of the iris 106 are aligned with each other on the straight line S1 and such that the center of the optical opening 107h of the iris 107 and the center of the optical opening 108h of the iris 108 are aligned with each other on the straight line S2 within a range of machining accuracy.

Further, a distance between the lens 102 and the iris 106 and a distance between the iris 107 and the iris 108 can be ensured such that an inclination of each of a straight line connecting the center of the lens 102 and the center of the iris 106 to each other and a straight line connecting the center of the iris 107 and the center of the iris 108 to each other from each of the straight line S1 and the straight line S2 is curbed within a range of 1 mrad. For example, in a case where the diaphragm diameter of each of the irises 106 to 108 is 1 mm, each of the distance between the lens 102 and the iris 106 and the distance between the iris 107 and the iris 108 can be set to at least 80 mm or more. As an example, the distance is 90 mm. By setting the distance between the lens 102 and the iris 106 and the distance between the iris 107 and the iris 108 to 80 mm or more, the inclination of each of the straight lines connecting the centers thereof from each of the straight line S1 and the straight line S2 is curbed within a range of 1 mrad. A distance between the straight line S1 and the straight line S2 does not have an upper limit as long as the optical components do not interfere with each other when the optical components are disposed on the straight lines S1 and S2. In order to avoid an increase in size of the optical system or an enlargement of the positional deviation of the beam due to the rotation of the reflective diffraction grating 104, which will be described later, the distance can be set within 100 mm. As an example, the distance is 40 mm.

Figure 6:
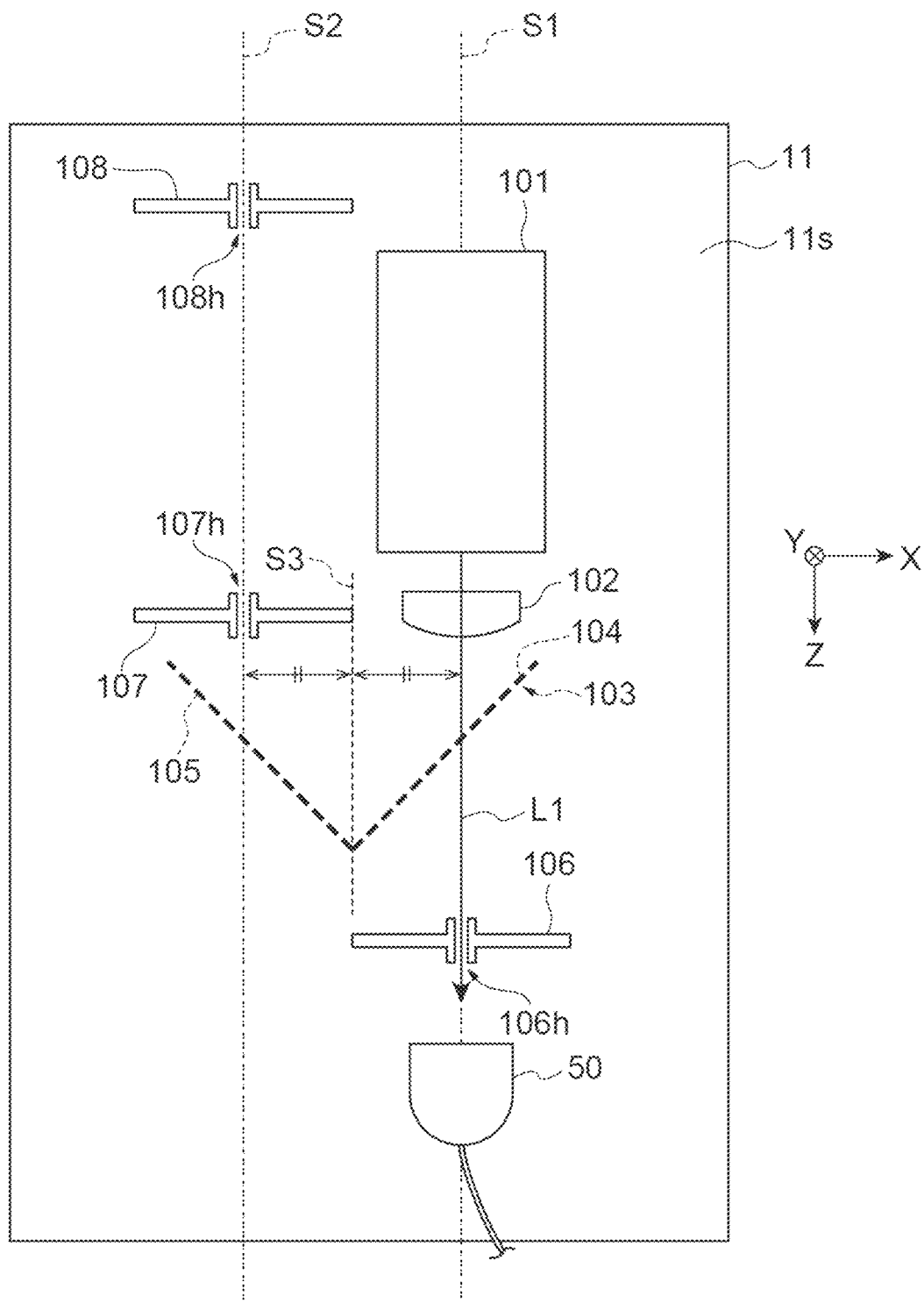
FIG. 6 is a schematic plan view showing each step of the optical axis adjustment method.

Subsequently, in the method, as shown in FIG. 6, the laser light source 101 is held and installed by the holding part 19 while a state in which the corner reflector 103 is not provided is maintained. The laser light source 101 is installed such that the output laser light L1 passes through the optical opening 106h of the iris 106 held by the holding part 16 via the lens 102 held by the holding part 12. Further, a detector 50 capable of detecting the light intensity of the laser light L1 that has passed through the optical opening 106h is installed at a position on the iris 106 on a side opposite to the laser light source 101.

Then, while the light intensity of the laser light L1 that has passed through the optical opening 106h of the iris 106 is monitored, the position of the laser light source 101 with respect to the lens 102 is adjusted such that the maximum value of the light intensity is obtained. As a result, the positional alignment between the light emitting point of the laser light source 101 and the center of the lens 102 is achieved. The center of the lens 102 and the center of the optical opening 106h of the iris 106 can be aligned with one straight line S1 within a range of machining accuracy of the base 11 and the holding part.

Through the above steps, the optical axis of the laser light L which is output from the laser light source 101 and passes through the lens 102 is aligned with the straight line S1. At this stage, the distance between the laser light source 101 and the lens 102 has not been optimized. At this stage, the distance between the laser light source 101 and the lens 102 should be adjusted such that the laser light L1 is converged near the iris 106 in order to monitor the light intensity.

Figure 7:
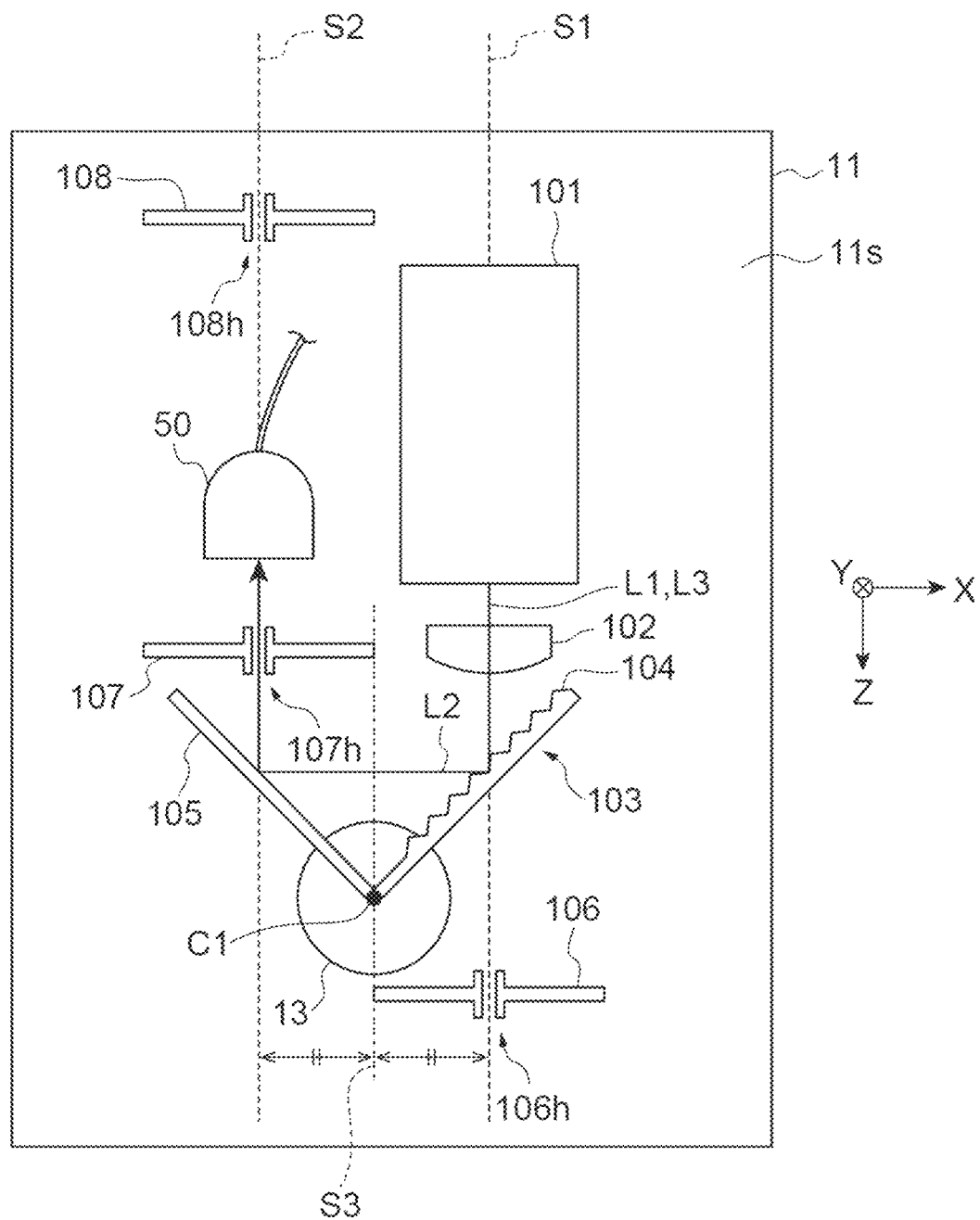
FIG. 7 is a schematic plan view showing each step of the optical axis adjustment method.

Subsequently, in the method, as shown in FIG. 7, the corner reflector 103 is held and installed by the holding part 13. Here, the reflecting surface 104s of the reflective diffraction grating 104 and the reflecting surface 105s of the mirror 105 only have to substantially orthogonal to each other at a visual level. Strict orthogonality between the reflecting surface 104s and the reflecting surface 105s is ensured through subsequent steps, which will be described later. Further, at this time, the angle of incidence of the laser light L1 on the reflecting surface 104s can be set to an angle at which the external resonator is established between the reflecting surface 104s and the laser light source 101, that is, an angle at which the 1st-order diffraction light L3 is fed back to the laser light source 101 via the lens 102. As described above, since the distance between the laser light source 101 and the lens 102 is not optimized at this stage, the external resonance is not established, the light output from the laser light source 101 increases by partially returning the return light from the reflective diffraction grating 104 to the laser light source 101.

On the other hand, a detector 50 capable of detecting the light intensity of the diffraction light L2 that has passed through the optical opening 107h is installed at a position on the iris 107 on a side opposite to the corner reflector 103. Then, while the light intensity of the diffraction light L2 that has passed through the optical opening 107h (for example, sufficiently diaphragmed to 1 mm or less) of the iris 107 via the corner reflector 103 is monitored, the angle of the reflective diffraction grating 104 is adjusted by the mechanism 22 of the holding part 13, and thus the optical axis of the diffraction light L2 from the reflective diffraction grating 104 is adjusted such that the maximum value of the light intensity is obtained. At this time, the optical axis of the diffraction light L2 can be further adjusted by moving the entire corner reflector 103 in the X-axis direction using the fourth mechanism.

Figure 8:
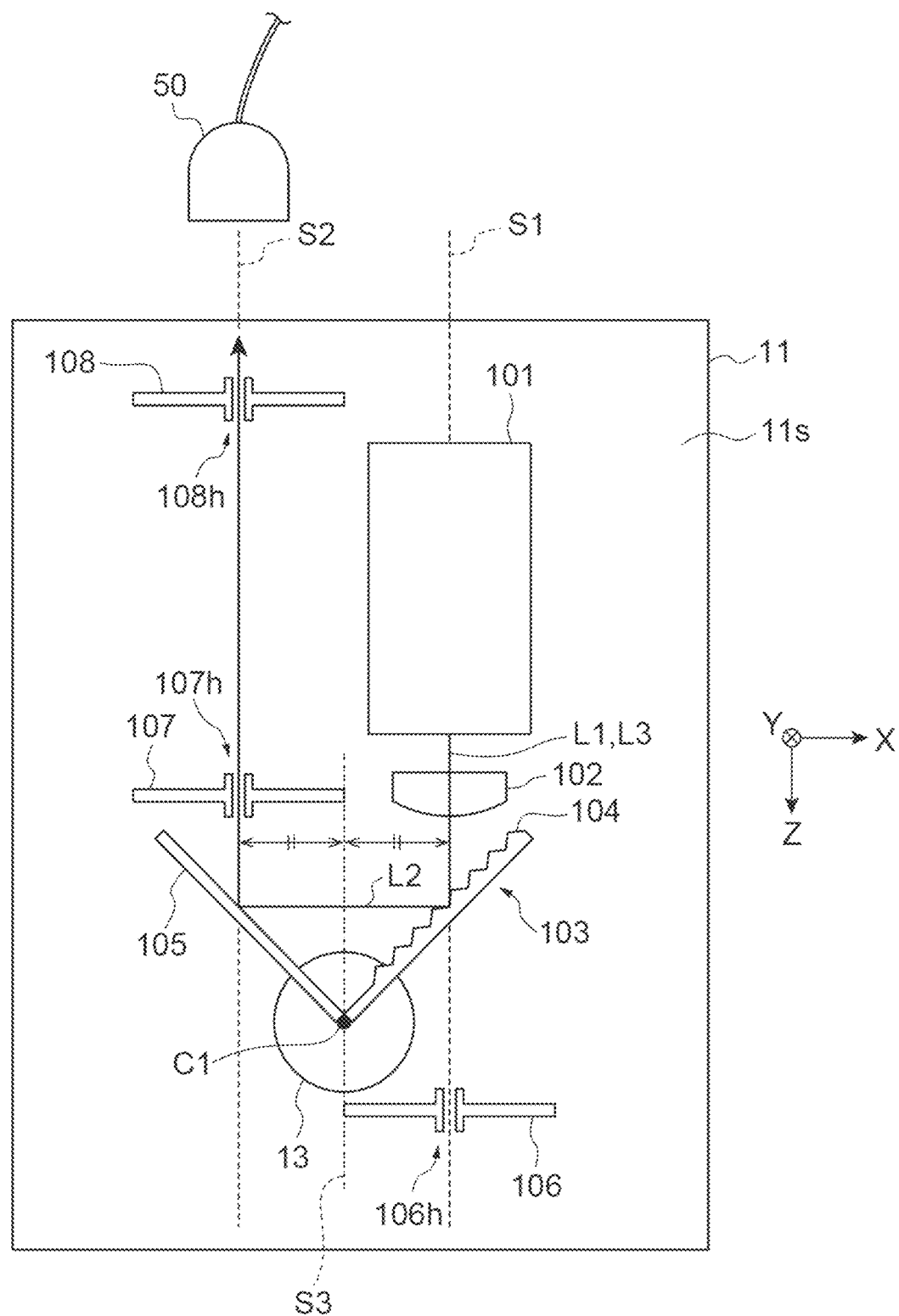
FIG. 8 is a schematic plan view showing each step of the optical axis adjustment method.

Subsequently, as shown in FIG. 8, when the maximum value of the light intensity of the diffraction light L2 that has passed through the optical opening 107h of the iris 107 is obtained, the optical opening 107h of the iris 107 is sufficiently enlarged, and a detector 50 capable of detecting the light intensity of the diffraction light L2 that has passed through the optical opening 108h is installed at a position on the iris 108 on a side opposite to the iris 107. Then, while the light intensity of the diffraction light L2 that has passed through the optical opening 108h (for example, sufficiently diaphragmed to 1 mm or less) of the iris 108 via the corner reflector 103 is monitored, the angle of the mirror 105 is adjusted by the mechanism 22 and the mechanism 23 of the holding part 13, and thus the optical axis of the diffraction light L2 from the mirror 105 is adjusted such that the maximum value of the light intensity is obtained.

The center of the optical opening 107h of the iris 107 and the center of the optical opening 108h of the iris 108 can be aligned with the straight line S2 within a range of machining accuracy of the base 11 and the holding parts. Therefore, by alternately repeating the optical axis adjustment of the diffraction light L2 performed while monitoring the intensity of the diffraction light L2 that has passed through the optical opening 107h of the iris 107 and the optical axis adjustment of the diffraction light L2 performed while monitoring the intensity of the diffraction light L2 that has passed through the optical opening 108h of the iris 108, the optical axis of the diffraction light L2 passing through the optical openings 107h and 108h of the irises 107 and 108 in order can be aligned with the straight line S2.

As a result of these adjustments, the optical axis of the laser light L1 which is output from the laser light source 101 and passes through the lens 102 and the optical axis of the diffraction light L2 passing through the optical openings 107h and 108h of the irises 107 and 108 via the corner reflector 103 can be aligned with the two straight lines S1 and S2 parallel to each other. Further, this ensures that the reflecting surface 104s of the reflective diffraction grating 104 and the reflecting surface 105s of the mirror 105 are orthogonal to each other, and the position and the direction of the output light set when the wavelength of the output light (the diffraction light L2) is selected by the rotation of the corner reflector 103 using the mechanism 21 are fixed.

Finally, in the method, the distance between the laser light source 101 and the lens 102 is adjusted as follows such that the light intensity of the diffraction light L2 that has passed through the optical opening 108h becomes maximum at an arbitrary distance from the iris 108 in a state where the optical openings 107h and 108h of the irises 107 and 108 are sufficiently enlarged. As a result, the laser light L1 from the laser light source 101 is collimated by the lens 102, and the laser light source 101 and the reflective diffraction grating 104 are optically coupled with each other, and thus the external resonance is established with the reflective diffraction grating 104 as one end of the resonator. As described above, according to the method, the optical axis of the external resonator can be adjusted by simply passing the light through the irises 106 to 107 in order after the laser light source 101 is installed.

As described above, the position and the direction of the output light can be adjusted using the optical kit 10 as follows. That is, first, the corner reflector 103 is held by the holding part 13. Then, while the light intensity of the diffraction light L2 that has passed through the optical opening 107h of the iris 107 via the corner reflector 103 is monitored, the optical axis of the diffraction light L2 from the reflective diffraction grating 104 is adjusted by the mechanism 22 such that the maximum value of the light intensity is obtained. When the maximum value of the light intensity of the diffraction light L2 that has passed through the optical opening 107h of the iris 107 is obtained, the optical opening 107h of the iris 107 is sufficiently enlarged, or the iris 107 is temporarily removed, and then, while the light intensity of the diffraction light L2 that has passed through the optical opening 108h of the iris 108 via the corner reflector 103 is monitored, the optical axis of the diffraction light L2 from the mirror 105 is adjusted by the mechanism 22 such that the maximum value of the light intensity is obtained. The center of the optical opening 107h of the iris 107 and the center of the optical opening 108h of the iris 108 can be aligned with the straight line S2 within a range of machining accuracy of the base 11 and the holding parts 17 and 18. Therefore, by alternately repeating the optical axis adjustment of the diffraction light L2 performed while monitoring the intensity of the diffraction light L2 that has passed through the optical opening 107h of the iris 107 and the optical axis adjustment of the diffraction light L2 performed while monitoring the intensity of the diffraction light L2 that has passed through the optical opening 108h of the iris 108, the optical axis of the diffraction light L2 passing through the optical openings 107h and 108h of the iris 107 and the iris 108 can be aligned with the one straight line.

As a result of these adjustments, the optical axis of the diffraction light L2 which is output from the laser light source 101 and passes through the optical openings 107h and 108h of the iris 107 and the iris 108 via the corner reflector 103 can be aligned with the straight line S2. Accordingly, the position and the direction of the output light are fixed. In this way, according to the optical kit 10, the position and the direction of the output light can be easily adjusted. Particularly, in the optical kit 10, the holding part 17 (the iris 107) is positioned closer to the holding part 13 than the emission surface 101s of the laser light L1 of the laser light source 101 held by the holding part 19, and the holding part 18 (the iris 108) is positioned closer to a side opposite to the holding part 13 than the emission surface 101s. That is, in the optical kit 10, the distance between the iris 107 and the iris 108 is ensured. Therefore, the inclination of the optical axis (the one straight line) of the diffraction light L2 passing through both the optical opening 107h of the iris 107 and the optical opening 108h of the iris 108 is curbed, and the position and the direction of the output light can be adjusted with higher accuracy.

Further, in the optical kit 10, the optical system includes the lens 102 which is disposed between the laser light source 101 and the corner reflector 103 and to which the laser light L1 is input in the z-axis positive direction and the iris 106 disposed to form the optical opening 106h through which the laser light L1 that has passed through the lens 102 passes in a case where the corner reflector 103 is not present, the laser light L1 that has passed through the lens 102 is incident on the reflective diffraction grating 104, the holding part has the holding part 12 for holding the lens 102 and the holding part 16 for holding the iris 106, and the holding part 13 includes the mechanism 21 that holds the entire corner reflector 103 to be rotatable along the main surface.

Therefore, the position and the direction of the output light can be adjusted as follows. That is, first, each holding part except for the holding part 13 is caused to hold one of the optical components except for the corner reflector 103 of the optical system. Further, the laser light source 101 is installed such that the laser light L1 output from the laser light source 101 passes through the optical opening 106h of the iris 106 held by the holding part 16 via the lens 102 held by the holding part 12. Next, while the light intensity of the laser light L1 that has passed through the optical opening 106h of the iris 106 is monitored, the position of the laser light source 101 with respect to the lens 102 is adjusted such that the maximum value of the light intensity is obtained. As a result, the positional alignment between the light emitting point of the laser light source 101 and the center of the lens 102 is achieved. The center of the lens 102 and the center of the optical opening 106h of the iris 106 can be aligned with the straight line S1 within a range of machining accuracy of the base 11 and the holding part 16. Therefore, through the above-described step, the optical axis of the laser light L1 which is output from the laser light source 101 and passes through the lens 102 is aligned with the straight line S1.

After that, in the same manner as described above, by performing the adjustments using the iris 107 and the iris 108, the optical axis of the diffraction light L2 passing through the optical openings 107h and 108h of the iris 107 and the iris 108 can be aligned with the straight line S2.

As a result of these two adjustments, the optical axis of the laser light L1 which is output from the laser light source 101 and passes through the lens and the optical axis of the diffraction light L2 passing through the optical openings 107h and 108h of the irises 107 and 108 via the corner reflector 103 can be aligned with the two straight lines S1 and S2 parallel to each other. This ensures that the reflecting surface 104s of the reflective diffraction grating 104 and the reflecting surface 105s of the mirror 105 are orthogonal to each other, and the position and the direction of the output light set when the wavelength of the output light (the 0th-order diffraction light) is selected by the rotation of the corner reflector 103 using the mechanism 21 are fixed. In this way, according to this optical kit 10, the position and the direction of the output light can be easily adjusted, and furthermore, a configuration in which the position and the direction of the output light set when the wavelength of the output light is selected are fixed can be easily realized.

In the optical kit 10, the holding part 17 (the iris 107) and the holding part 12 (the lens 102) are arranged in the X-axis direction. Thus, the space between the emission surface 101s of the laser light source 101 and the corner reflector 103 can be utilized.

Further, in the optical kit 10, the laser light source 101 includes the laser element 110 that oscillates the laser light L1 and the cooling part (the heat sink 170 and the fan 180) provided on the laser element 110 on a side opposite to the emission surface 101s of the laser light L1 for cooling the laser element 110. The holding part 18 (the iris 108) is positioned closer to a side opposite to the holding part 13 (the corner reflector 103) than the cooling part in the Z-axis negative direction (the third direction). Therefore, it is possible to more reliably secure the distance between the irises 107 and 108 and curb the influence of exhaust heat from the cooling part on the optical axis adjustment using the iris 108.

Further, in the optical kit 10, the mechanism 22 enables the adjustment of the optical axis of the diffraction light L2 by holding the reflective diffraction grating 104 and the mirror 105 to be independently rotatable of each other about the rotation axes along the main surface 11s. Therefore, it is possible to enable the adjustment of the optical axis of the diffraction light L2 by holding the reflective diffraction grating 104 and the mirror 105 to be independently rotatable of each other about the rotation axes along the main surface 11s.

Further, in the optical kit 10, the holding part 13 further includes the mechanism 23 that holds the reflective diffraction grating 104 such that the reflective diffraction grating 104 does not rotate along the main surface 11s and holds the mirror 105 such that the mirror 105 independently rotates along the main surface 11s. In this case, it is possible to adjust the optical axis of the diffraction light L2 from the mirror 105 while an unintended change of the wavelength of the diffracted light L2 is curbed.

Further, in the optical kit 10, the holding part 13 may further include the fourth mechanism that holds the corner reflector 103 to be movable in the X-axis direction. In this case, the degree of freedom in adjusting the optical axis of the diffraction light L3 emitted from the corner reflector 103 is improved.

In the above configuration, even if the angle of the reflective diffraction grating 104, that is, the angle of the corner reflector 103, is changed, in order to prevent the positional deviation from occurring in the optical axis of the diffraction light L2 reflected by the mirror 105, it is necessary that the reflecting surfaces 104s and 105s of the diffraction grating 104 and the mirror 105 be perpendicular to each other and the center of rotation of the corner reflector 103 (the position of the rotation axis A1) be disposed at equal distances from the straight lines S1 and S2.

However, these conditions are naturally established as a result of the above optical axis adjustment method for aligning the optical axis with the two parallel straight lines S1 and S2. By simply performing the optical axis adjustment in the above procedure, it is possible to establish the external resonator and to curb the changes in the position and the direction of the beam due to the rotation of the corner reflector 103 at the same time. In the above optical axis adjustment method, a method is adopted in which the reflective diffraction grating 104 and the mirror 105 are adjusted by the adjustment mechanism (the mechanism 22 and the mechanism 23) regardless of the strict perpendicularity of the mutual reflecting surfaces 104s and 105s in advance. The reason for adopting this method is that a slight tilt or positional deviation that may occur due to replacement of the laser light source or the diffraction grating, or deviation from the ideal state depending on the machining accuracy for determining the positions of the lens 102 and the irises 106 to 108 or the opening diameters of the irises 106 to 108 is absorbed and the optical axis along the straight lines S1 and S2 is realized by this method.

Even if a configuration in which the positional deviation of the optical axis of the emitted light due to the angle change of the corner reflector does not occur is realized by separately forming a corner reflector in which the reflecting surface of the reflective diffraction grating and the reflecting surface of the mirror are disposed at a strict right angle and incorporating the separately formed corner reflector without using the configuration according to the above embodiment, the adjustment to absorb the above tilt or the positional deviation is necessary in order to guide the emitted light to a desired position and a desired direction. Therefore, it is very troublesome for the user to form a corner reflector having a strict right angle every time the reflective diffraction grating is replaced. That is, in the present embodiment, it is possible to greatly improve the user's convenience of adjustment work when the laser light source or the diffraction grating is replaced using the irises 106 to 108 disposed as described above and the adjustment mechanism of the corner reflector 103.

Furthermore, in the optical system of the present embodiment, even after the laser light source or the diffraction grating is replaced and the alignment is redone, the output light is always taken out in the position and the direction along the straight line S2 defined by the irises 107 and 108, and thus the optical axis before the replacement can be reproduced even after the replacement of the optical component and the accompanying alignment. Therefore, it is possible to replace the laser light source or the diffraction grating without affecting the external optical system using the laser device 100 of the present embodiment as a wavelength variable light source. As described above, the optical kit 10 according to the present embodiment is suitable as an optical kit that facilitates replacement and alignment of the optical component such as the laser light source or the diffraction grating.

Figure 9:
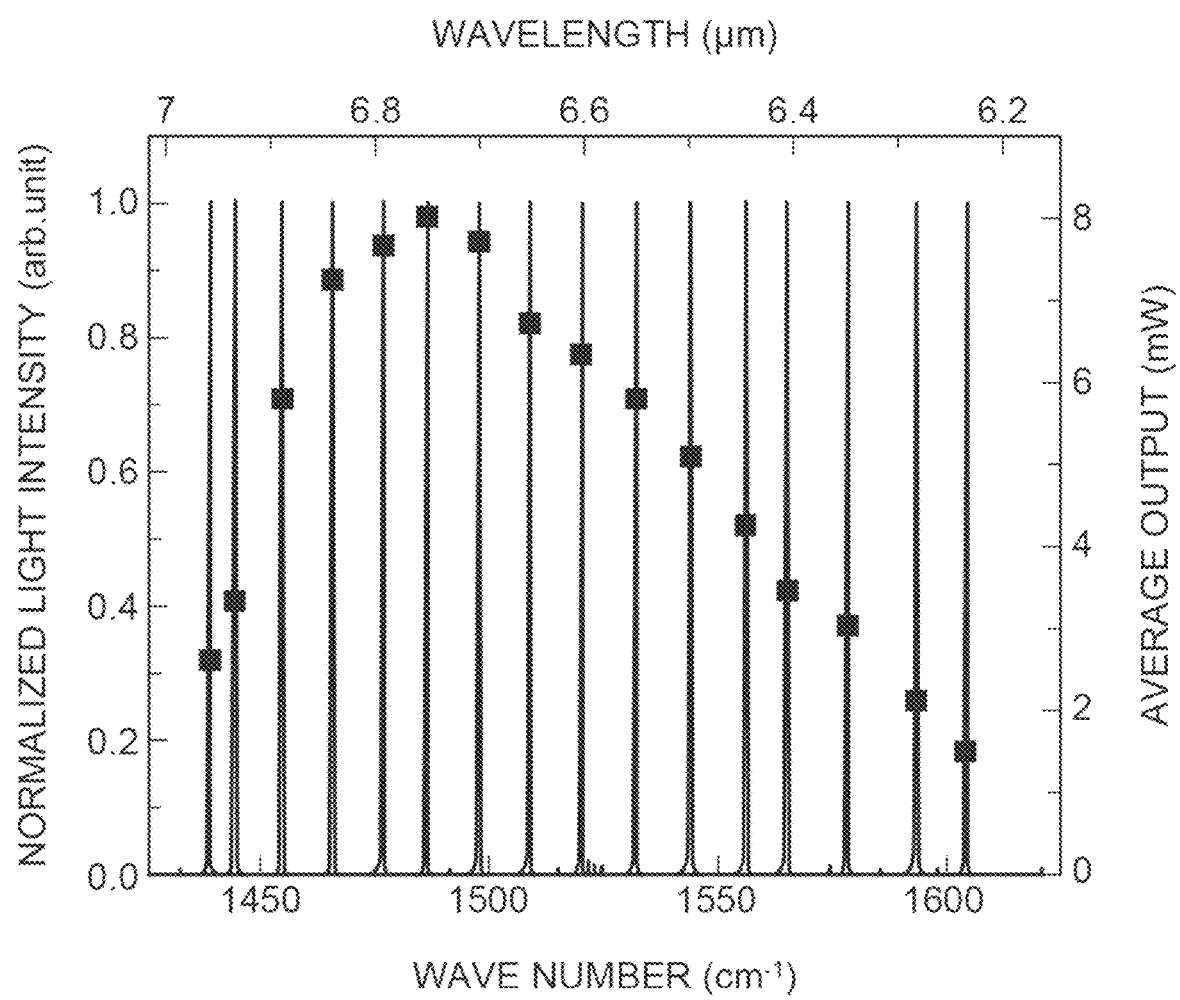
FIG. 9 is a graph showing an example of a result of performing the above-described optical axis adjustment method using the optical kit according to the present embodiment.
Figure 10:
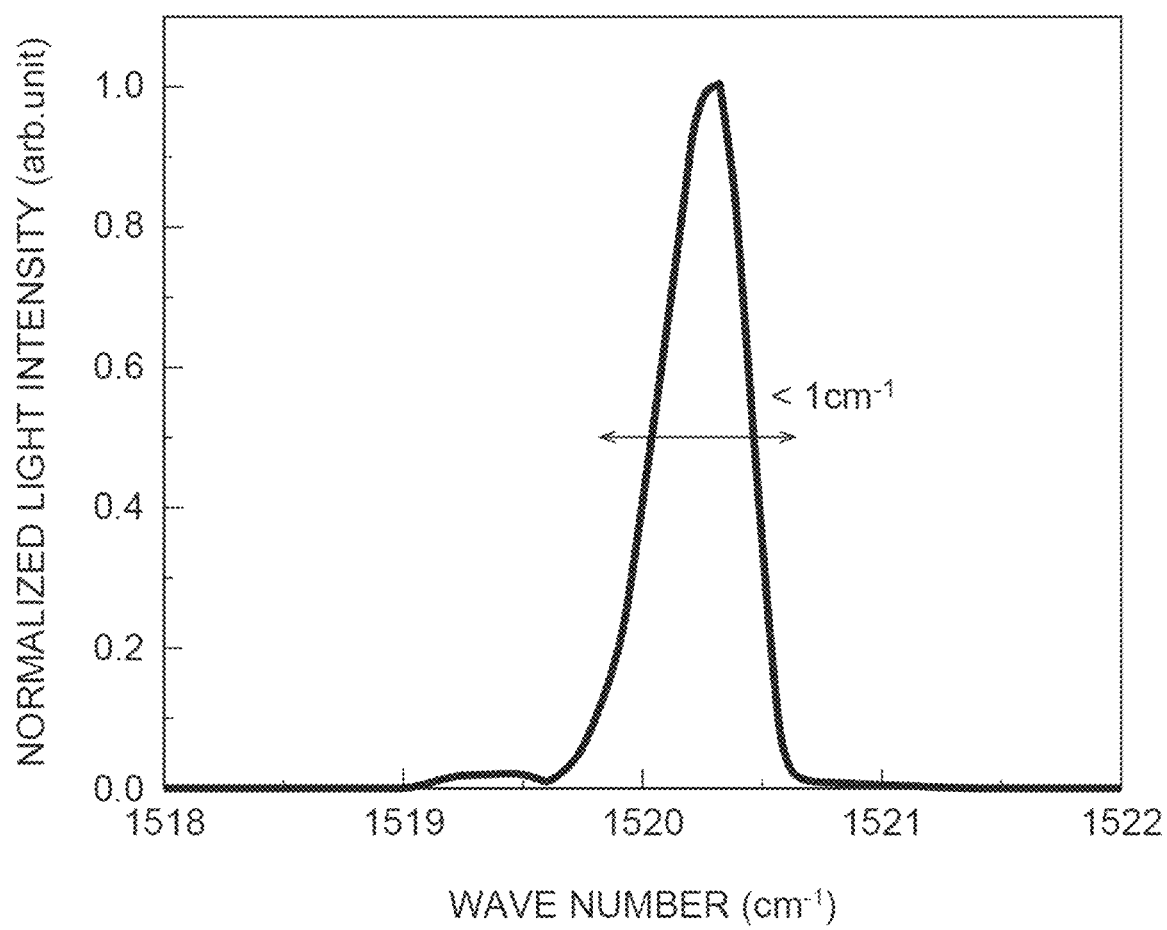
FIG. 10 is a graph showing an example of a result of performing the above-described optical axis adjustment method using the optical kit according to the present embodiment.
Figure 11:
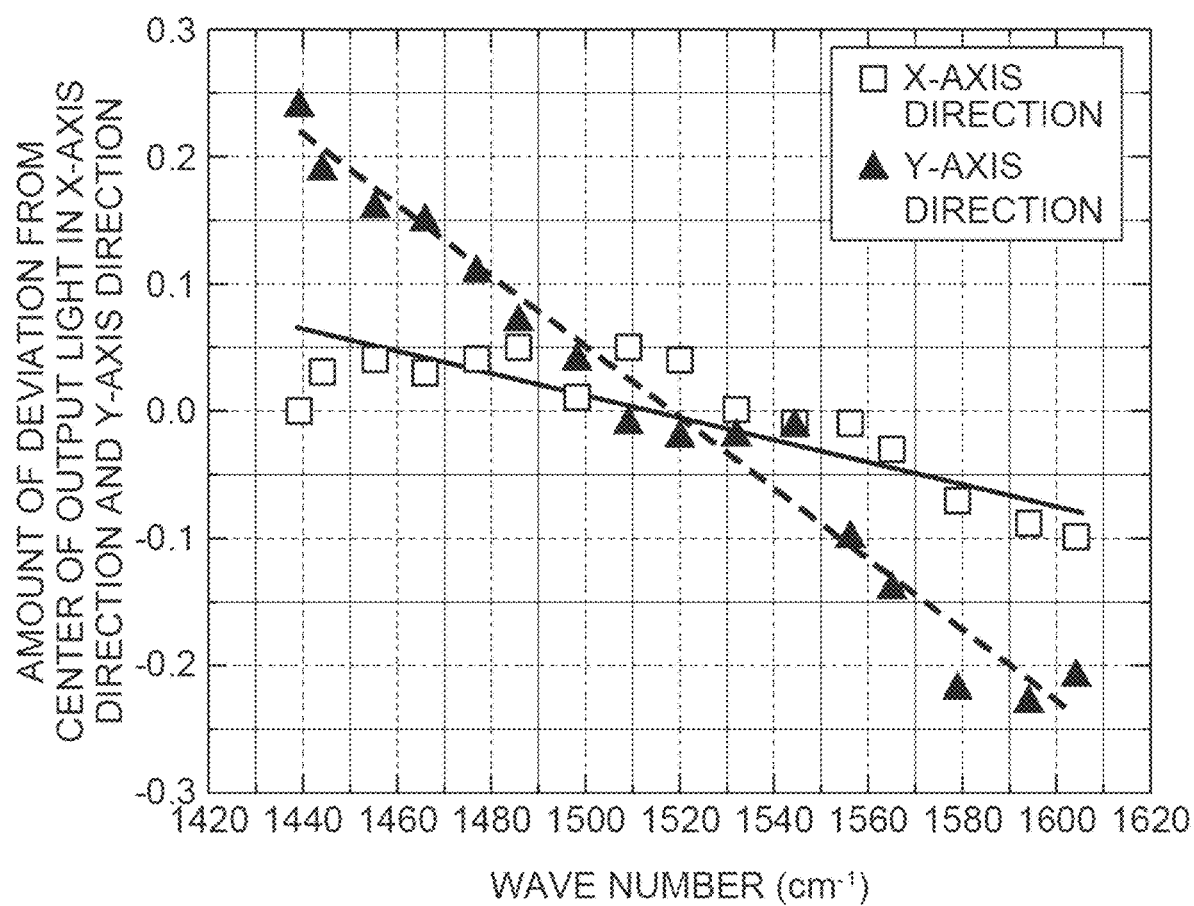
FIG. 11 is a graph showing an example of a result of performing the above-described optical axis adjustment method using the optical kit according to the present embodiment.

Each of FIGS. 9 to 11 is a graph showing an example of a result of performing the above-described optical axis adjustment method using the optical kit according to the present embodiment. In FIG. 9, a lower horizontal axis indicates a wave number, an upper horizontal axis indicates a wavelength, a left vertical axis indicates normalized light intensity, and a right vertical axis indicates an average output. Each plot in the graph of FIG. 9 indicates the average output with respect to a peak wavelength (the wave number) of each light intensity. FIG. 10 is a graph in which a part of FIG. 9 is enlarged. As shown in FIGS. 9 and 10, according to the optical axis adjustment using this optical kit 10, it is possible to realize the laser device 100 capable of freely selecting an oscillation wavelength in a single mode with a full width at half maximum of less than 1 $cm^{-1}$ in a wavelength (a wave number) range exceeding 150 $cm^{-1}$.

In FIG. 11, a horizontal axis indicates the wave number, and a vertical axis indicates the amount of deviation from the center of the output light in the X-axis direction and the Y-axis direction. As shown in FIG. 11, according to the optical axis adjustment using this optical kit 10, it is possible to realize the laser device 100 in which the positional deviation of the output light is curbed to a range of 0.5 mrad in any direction of the X-axis direction and the Y-axis direction when a wavelength is selected in the wavelength (the wave number) range exceeding 150 $cm^{-1}$. Thus, if this optical kit 10 is used, it is possible to provide an external resonator light source that can be suitably employed for precise measurements such as spectroscopy.

The above embodiment describes an example of the present disclosure. Accordingly, the present disclosure is not limited to the optical kit 10 and the laser device 100 described above and may be arbitrarily modified.

For example, in the holding part 17 and the iris 107, in order to secure the distance between the iris 107 and the iris 108 as long as possible, the holding part 17 and the iris 107 can be disposed as close to the corner reflector 103 (the mirror 105) as possible. However, it is necessary to prevent the mirror 105 from interfering with the holding part 17 and the iris 107 when the corner reflector 103 is rotated about the rotation axis A1 using the mechanism 21. Similarly, it is necessary to prevent the reflective diffraction grating 104 from interfering with the holding part 12 and the lens 102 when the corner reflector 103 is rotated about the rotation axis A1.

Figure 12:
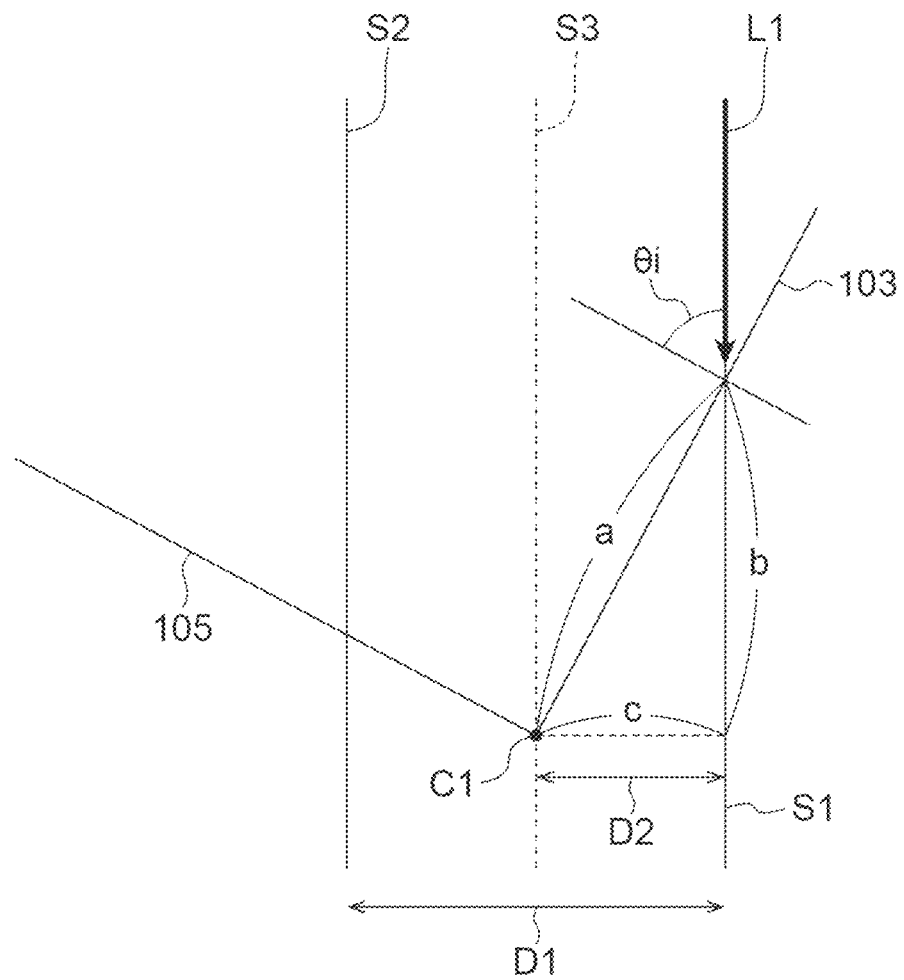
FIG. 12 is a plan view for explaining a modification example.

Under these circumstances, a case where the holding part 12, the lens 102, the holding part 17, and the iris 107 are brought closest to the corner reflector 103 will be examined with reference to FIG. 12. It is assumed that the incidence angle θi of the laser light L1 on the reflective diffraction grating 104 is 250 or more and 65° or less. The laser light L1 passes through the center of lens 102 on the straight line S1. On the other hand, in a case where it is desired to dispose the reflective diffraction grating 104 as close to the end of the base 11 as possible, one end of the reflective diffraction grating 104 can be aligned with the intersection point C1 (the center of rotation of the reflective diffraction grating 104) on the straight line S3. In this situation, in order for reflective diffraction grating 104 to receive the incidence of the laser light L1, the reflective diffraction grating 104 needs to extend in the an X-axis positive direction by a distance D2 between the straight lines S1 and S3, and the other end thereof needs to reach the straight line S1. At this time, a distance from the intersection point C1 to an intersection point between the reflective diffraction grating 104 and the straight line S1 is calculated as a distance D2×1/cos 65° using the distance D2 between the straight line S1 and the straight line S3 (½ of a distance D1 between the straight line S1 and the straight line S2). Furthermore, in consideration of a beam diameter R of the laser light L1 that is collimated by the lens 102 and is incident on the reflective diffraction grating 104, a length a of the reflective diffraction grating 104 is set to (distance D2 between straight line S1 and straight line S3+beam diameter R of collimated laser light L1)×1/cos θi, and thus the lens 102 can be disposed closer to the corner reflector 103. Similarly, the above is applied to the mirror 105.

In addition, in the laser device described above, the holding part 13 is not limited to the configuration in which the corner reflector 103 is integrally attached to and detached from the holding part 13. The holding part 13 may detachably hold only the reflective diffraction grating 104 of the corner reflector 103.

Further, instead of the irises 106 to 108, an opening member such as a pinhole that does not have a diaphragm function, that is, does not have a function to adjust the size of each of the optical openings 106h to 108h, may be used. In this case, each of the holding parts 16 to 18 only has to hold the opening member such as the pinhole to be insertable into and removable from an optical path of the laser light L1 or the diffraction light L2. That is, the irises 106 to 108 can be an arbitrary member capable of forming the optical opening in the optical path of the laser light L1 or the diffraction light L2.

Furthermore, as the method of monitoring the light intensity of the laser light L1 or the diffraction light L2 during the optical axis adjustment, the method using the detector 50 can be replaced with a method using a thermosensitive dye or the like, and the present disclosure is not particularly limited to this.

Here, in the above-described embodiment, a case where the first direction, which is an incidence direction of the laser light L1 on the reflective diffraction grating 104, is the Z-axis positive direction, and the third direction, which is a reflection direction of the diffraction light L2 from the mirror 105, is the Z-axis negative direction is illustrated. That is, in the above example, the third direction is a direction opposite to the first direction. In this example, the straight line S1 and the straight line S2 are parallel to each other and aligned with the Z-axis direction. However, the third direction only has to be a direction different from the first direction and the second direction. For example, the third direction (the straight line S2) may include an X-axis component in addition to a Z-axis component, and as an example, can include the X-axis component smaller than the Z-axis component.

Even in such a case, if the intersection point C1 between the reflecting surface 104s (the extension line thereof) of the reflective diffraction grating 104 and the reflecting surface 105s (the extension line thereof) of the mirror 105 is the rotation axis A1, the position and the direction of the output light is fixed when the wavelength tuning process is performed by rotating the corner reflector 103. In this case, the reflective diffraction grating 104 and the mirror 105 do not form a right angle, but, by the same adjusting method as in the above embodiment, as a result, the reflective diffraction grating 104 and the mirror 105 are disposed at a predetermined angle according to the angle formed by the straight line S1 and the straight line S2.

Furthermore, in the above embodiment, the laser device 100 formed by the optical kit 10 is illustrated as an example of the optical device. However, the optical device is not limited to that utilizing the optical kit 10. For example, the optical device may be a predetermined laser device in which the above holding parts 12 to 19 are provided on a predetermined surface of an arbitrary member such as a housing of the predetermined laser device and an optical system including an external resonator is formed by the above optical components held by the holding parts 12 to 19. In this case, the position and the direction of the output light can be adjusted easily and with high accuracy not only when the light source is replaced, but also when the optical components incorporated in the device are adjusted in the event of deviation over time due to deterioration of fixtures, and thus this optical device is effective.

INDUSTRIAL APPLICABILITY

It is possible to provide an optical kit and an optical device that enable easy adjustment of a position and a direction of output light.

REFERENCE SIGNS LIST

10 Optical kit
11 Base
11s Main surface
12 Holding part (lens holding part)
13 Holding part (reflector holding part)
16 Holding part (third opening member holding part)
17 Holding part (first opening member holding part)
18 Holding part (second opening member holding part)
19 Holding part (light source holding part)
21 Mechanism (second mechanism)
22 Mechanism (first mechanism)
23 Mechanism (third mechanism)
100 Laser device (optical device)
101 Laser light source
110 Laser element
101s Emission surface

The invention claimed is:

1. An optical kit for forming an optical system including an external resonator of a laser light source that outputs laser light, the optical kit comprising:
a base including a main surface;
a light source holding part provided on the main surface and configured to hold the laser light source; and
a holding part provided on the main surface and configured to hold the optical system,
wherein the optical system includes
a corner reflector constituted by a reflective diffraction grating configured to diffract laser light emitted from the laser light source and is incident from a first direction and configured to reflect 0th-order diffraction light in a second direction intersecting with the first direction and a mirror configured to reflect the diffraction light from the reflective diffraction grating in a third direction different from the first direction and the second direction, and
a first opening member and a second opening member arranged in the third direction to form an optical opening through which the diffraction light from the corner reflector passes in order,
wherein the holding part has
a reflector holding part configured to hold the corner reflector,
a first opening member holding part configured to hold the first opening member, and
a second opening member holding part configured to hold the second opening member,
wherein the reflector holding part includes a first mechanism that enables adjustment of an optical axis of the diffraction light in each of the reflective diffraction grating and the mirror,
wherein, in the third direction, the first opening member holding part is positioned closer to the reflector holding part than an emission surface of the laser light of the laser light source held by the light source holding part, and
wherein, in the third direction, the second opening member holding part is positioned closer to a side opposite to the reflector holding part than the emission surface of the laser light of the laser light source held by the light source holding part.

2. The optical kit according to claim 1,
wherein the optical system includes
a lens which is disposed between the laser light source and the corner reflector and to which the laser light is input in the first direction, and
a third opening member disposed to form an optical opening through which the laser light that has passed through the lens passes in a case where the corner reflector is not present,
wherein the laser light that has passed through the lens is incident on the reflective diffraction grating,
wherein the holding part has
a lens holding part configured to hold the lens, and
a third opening member holding part configured to hold the third opening member, and
wherein the reflector holding part includes a second mechanism configured to hold the entire corner reflector to be rotatable along the main surface.

3. The optical kit according to claim 2, wherein the first opening member holding part and the lens holding part are arranged in the second direction.

4. The optical kit according to claim 1,
wherein the laser light source includes
a laser element configured to oscillate the laser light, and
a cooling part provided in the laser element on a side opposite to the emission surface of the laser light and configured to cool the laser element, and
wherein the second opening member holding part is positioned closer to a side opposite to the reflector holding part than the cooling part in the third direction.

5. The optical kit according to claim 1, wherein the first mechanism enables adjustment of an optical axis of the diffraction light by holding the reflective diffraction grating and the mirror to be independently rotatable of each other about rotation axes along the main surface.

6. The optical kit according to claim 1, wherein the reflector holding part further includes a third mechanism configured to hold the reflective diffraction grating such that the reflective diffraction grating does not rotate along the main surface and configured to hold the mirror such that the mirror independently rotates along the main surface.

7. The optical kit according to claim 1, wherein the reflector holding part further includes a fourth mechanism configured to hold the corner reflector to be movable in the second direction.

8. An optical device comprising:
the optical kit according to claim 1;
the laser light source held by the light source holding part;
the corner reflector held by the reflector holding part;
the first opening member held by the first opening member holding part; and
the second opening member held by the second opening member holding part.

9. An optical device in which an optical system including an external resonator of a laser light source configured to output laser light is formed, the optical device comprising:
a light source holding part provided on a predetermined surface of the optical device and configured to hold the laser light source; and a holding part provided on the predetermined surface configured to hold the optical system, wherein the optical system includes a corner reflector constituted by a reflective diffraction grating configured to diffract laser light emitted from the laser light source and is incident in a first direction and configured to reflect 0th-order diffraction light in a second direction intersecting with the first direction and a mirror configured to reflect the diffraction light from the reflective diffraction grating in a third direction different from the first direction and the second direction, and a first opening member and a second opening member arranged in the third direction to form an optical opening through which the diffraction light from the corner reflector passes in order, wherein the holding part has a reflector holding part configured to hold the corner reflector, a first opening member holding part configured to hold the first opening member, and a second opening member holding part configured to hold the second opening member, wherein the reflector holding part includes a first mechanism that enables adjustment of an optical axis of the diffraction light in each of the reflective diffraction grating and the mirror, wherein the first opening member holding part is positioned closer to the reflector holding part than an emission surface of the laser light of the laser light source held by the light source holding part in the third direction, and wherein the second opening member holding part is positioned closer to a side opposite to the reflector holding part than the emission surface of the laser light of the laser light source held by the light source holding part in the third direction.

* * * * *